Jan. 20, 1959     R. M. RUCKER     2,869,819
GATE VALVE
Filed June 25, 1954
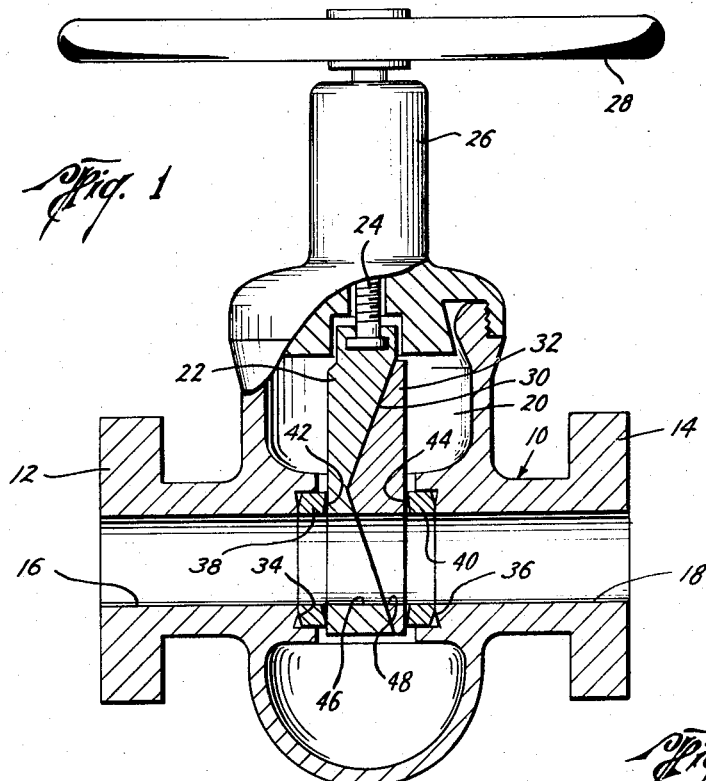
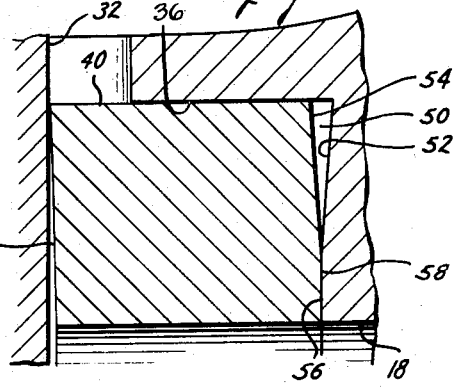
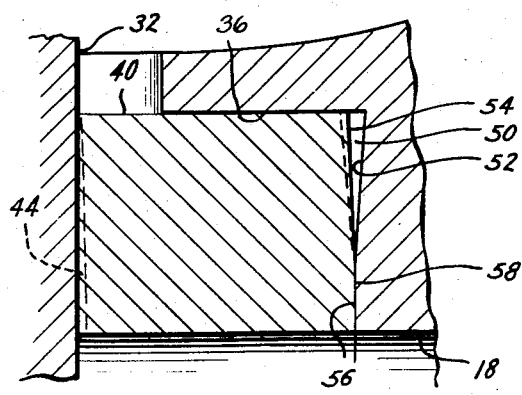
Robert M. Rucker
INVENTOR.
BY Charles E. Lightfoot
ATTORNEY

United States Patent Office 2,869,819
Patented Jan. 20, 1959

2,869,819

GATE VALVE

Robert M. Rucker, Houston, Tex., assignor to ACF Industries, Incorporated, New York, N. Y., a corporation of New Jersey Application June 25, 1954, Serial No. 439,190

6 Claims. (Cl. 251—199)

This invention relates to a gate valve, and more particularly to a gate valve of the sliding gate type, having improved valve seating means.

In valves of the sliding gate type, as heretofore commonly constructed, a valve casing is provided, having a flowway therethrough, which is intersected by a valve chamber extending transversely of the flowway and in which the valve gate is slidably mounted. The valve casing, in valves of this type, is usually provided with internal annular recesses opening into the valve chamber and surrounding the flowway on opposite sides of the valve, in which recesses ring-like seat forming inserts are positioned, such inserts being formed of suitable material, such as bronze or the like, with which the valve gate is engageable when in closed position to form a fluid tight seal between the valve and casing.

As heretofore constructed the recesses and inserts of valves of this type are usually of rectangular shape, in cross section, and the inserts are made to form a tight fit with the recesses into which they are inserted under pressure.

Valves so constructed are subject to the disadvantage that the seat inserts are often distorted when inserted under pressure in the recesses, making it necessary to machine or grind the seating surfaces to assure proper seating of the valve gate thereon when closed. Moreover, such distortion of the valve seating inserts frequently causes dragging or sticking of the valves thereon, which results in displacement of the inserts in the recesses, so that fluid under pressure from the flowway is allowed to enter the recesses between the inserts and the casing, causing a piston like movement of the inserts which results in loosening of the inserts.

The present invention has for its chief object the provision of a gate valve structure in which the above disadvantages are overcome, and in which valve seating means of improved construction is embodied.

Another object of the invention is to provide seats for a through conduit wedge gate valve which will remain stationary when the gate is collapsed.

Another object of the invention is to provide a gate valve embodying a valve seat structure of the type referred to, wherein means is provided to control distortion of the seat forming inserts during insertion of the same in the recesses of the casing, and also including means for preventing the inserts from becoming loosened in the recesses due to wear caused by repeated operation of the valve.

A further object of the invention is the provision of a gate valve structure of the type mentioned, embodying means for securing sealing contact between the seat forming inserts and the casing, whereby the entrance of fluid from the flowway between the inserts and casing is prevented.

Another object of the invention is to provide a gate valve structure embodying seat forming means positioned to be engaged by the valve to form a seal between the valve gate and casing, when the valve is in closed position, and which is constructed to resist distortion or displacement due to repeated opening and closing of the valve.

A still further object of the invention is to provide a gate valve seat structure which is of simple design and rugged construction, and which may be easily and economically manufactured.

The above and other important objects and advantages of the invention may best be understood from the following detailed description, constituting a specification of the same, when considered in conjunction with the annexed drawings, wherein—

Figure 1 is a side elevational view, partly broken away and partly in vertical central cross section, illustrating a preferred embodiment of the invention;

Figure 2 is a fragmentary cross sectional view on a greatly enlarged scale, illustrating the details of structure of the recess and seat forming insert of the invention; and Figure 3 is a view similar to that of Figure 2, illustrating the effect on the seal forming inserts of repeated opening and closing movements of the valve.

Referring now to the drawings in greater detail, the invention is illustrated herein in connection with a conventional type of sliding gate valve, having a valve casing 10, provided with inlet and outlet connections 12 and 14, whereby the casing may be connected into any desired equipment, such as a pipe line, in the usual manner. The connections 12 and 14 are tubular, and provide inlet and outlet passageways 16 and 18, forming the flowway of the valve, and the casing is formed with an inner valve chamber 20 into which the passageways 16 and 18 open at their inner ends.

Within the valve chamber 20 a valve gate is movably mounted for sliding movement transversly of the flowway to open or close the flowway. This valve gate may be of conventional design, comprising a main element 22 which is connected at its upper end to a valve stem 24, which is threadably carried in a valve bonnet 26, removably attached to the casing and closing the upper end of the valve chamber 20, the stem extending upwardly through the bonnet and carrying at its upper end a suitable valve actuating member, such as the hand wheel 28. The stem 24 may be threadably connected to the bonnet, so that upon rotation of the hand wheel 28 the main valve member 22 may be moved laterally of the flowway in the valve chamber to open or closed position. The main valve member 22 has a substantially V-shaped surface 30 and the valve gate includes a segment or wedge member 32, having a face which is shaped to conform to the V-shaped face of the main valve member, and positioned in sliding contact therewith, whereby the valve gate will be expanded upon movement of the valve to either open or closed position, in the usual manner.

At the inner ends of the passageways 16 and 18 the valve casing is provided with annular recesses 34 and 36, respectively, surrounding the flowway, and opening into the valve chamber 20, in which recesses annular seat forming inserts 38 and 40, respectively, are disposed whose inner faces 42 and 44 respectively, are positioned within the valve chamber, in position for sealing engagement with the valve members 22 and 32, respectively. The valve members 22 and 32 are provided with suitable openings 46 and 48, respectively therethrough, which are positioned in registration and which will be in axial alignment with the flowway when the valve is moved to open position, as illustrated in Figure 1, and which are moved out of alignment with the flowway when the valve is moved to closed position. In the operation of gate valves of this type the hand wheel 28 may be rotated in a direction to move the gate upwardly in the casing, whereupon the valve members 22 and 32 move upwardly to bring the openings 46 and 48 therein into axial alignment with the flowway, and thereafter the member 22 is moved upwardly relative to the member 32, which is in engagement at its upper end with the bonnet 26. Upon such upward movement of the member 22 relative to the member 32, the members of the gate will be wedged apart so that the gate is expanded into sealing contact with the seat forming inserts 38 and 40, in the open position of the valve. Similarly the hand wheel 28 may be rotated in a direction to move the main member 22 downwardly, and the member 32 will be carried downwardly therewith to move the openings 46 and 48 out of axial alignment with the flowway, and when the gate has been thus moved to closing position the main member 22 may be moved downwardly relative to the member 32 to again expand the gate into sealing engagement with the seating inserts 38 and 40.

As previously mentioned, the internal annular recesses and seat forming inserts in valves of this type, are customarily formed, of rectangular cross section, and in many cases the seat forming inserts are made with an outer diameter which is slightly larger than the maximum diameter of the recesses, such inserts being then inserted in the recesses by the application of high pressure to form a press fit to securely hold the inserts in the recesses. This method of assembling the inserts in the valve casing may result in distortion of the insert, so that the seating surface with which the valve gate makes contact is no longer flat. Since the distortion is uncontrolled, the high spots may occur adjacent the bore or along the outer edge of the insert. One method of eliminating such high spots has been to remachine the seating surface of the insert after it has been assembled; however, such method is expensive. In such type of construction, the seal between the seat insert and the valve casing is that established by the interference fit of the larger insert into the smaller recess cavity. Since the seal is around the circumferential surface between the seat insert and recess, line pressure in the passageway can flow between the rear of the upstream seat insert and the back wall of the recess. As the valve gate is collapsed, the upstream seat insert being acted upon by pressure at the rear will float out of the recess and drag against the valve gate as it is being raised, thereby increasing the torque required to operate the valve.

In order to overcome the above disadvantages, the recesses 34 and 36 in the valve casing 10 may be formed with slightly relieved or deepened portions 50, adjacent the side walls of the recesses, such portion being shown in the drawing by the angularly disposed bottom wall portion 52 and the adjacent side wall of the recess. The inserts 38 and 40 are also provided with beveled surface portions 54, disposed opposite the bottom wall portion 52. Radially inwardly of the bottom wall portion 52, the bottom of the recess has a wall portion 56 forming an annular shoulder. Each insert is likewise provided with a wall portion 58, arranged to contact the wall portion 56 when the insert is positioned in the recess. The seating face 44 of the seat insert is sloped outwardly from the passageway, such sloping is less than the sloping of rear of the seat insert, see Fig. 2.

To assemble the valve, the seat insert 40 may be pressed into the recess 36 by the use of a hydraulic ram. The ram acts in a manner similar to the action of gate 32 and first makes contact with the outer circumferential edge of the front face 44 of the insert 40 progressively engaging the remainder of the front face of the seat insert as it forces the insert 40 into its seat cavity. As the insert moves into the recess, the shoulder 56 will make the initial contact with the back wall of the recess. Inasmuch as the remainder of the back is relieved, by tapering either the back wall of the recess or the back wall of the insert, there will be room for the flow of material.

It will be appreciated that the space 50 provided between the face portions 52 and 54 of the recess and insert may be of any desired shape and size, such space being usually a matter of only a few thousandths of an inch, depending upon the particular characteristics of the materials of which the parts are formed. By this means, sufficient space is provided to accommodate the expansion or distortion of the material of the inserts when the same are forced into the recesses under high pressure, so that the seating surfaces of the inserts will be accurately located for sealing contact with the valve gate in the open and closed positions of the valve, and distortion of the inserts, due to the pressure of the gate mechanism when it is expanded into sealing contact therewith, or the dragging of the gate on the insert during the operation of the valve, is effectively prevented.

Even if there is distortion, at no time will the distortion be such that any portion of the seating surface of the seat insert is higher than the outer edge of the original sloping face of the seat; thus, at all times initial contact of the valve gate with the seating face of the insert will be at the outer edge. Therefore, as the valve gate expands in fully open or fully closed position, it will initially contact the outer edge and tend to straighten out the seating face of the seat insert. The resultant force of the pressure applied will cause the shoulder 56 to pinch off and seal the back of the seat insert from pressure in the passageway. Also, as the valve gate is collapsed, it will first break contact with the seating face of the insert at the inner edge of the seating face; therefore, pressure in the passageway will flow across the face of the seat insert and tend to keep the upstream seat insert in position, whereby it will not float out and drag against the face of the gate, especially since there is no pressure at the back of the seat tending to push it toward the gate.

It will thus be seen that the invention provides a valve assembly of simple design and rugged construction, wherein the seat forming means is of economical design, and easily applied, and is capable of long withstanding the hard conditions of wear and exposure to which devices of this character are usually subjected.

While the invention has been disclosed herein in connection with a specific embodiment of the same, it will be understood that this is intended by way of illustration only, and that numerous changes can be made in the construction and arrangement of the various parts, without departing from the spirit of the invention or the scope of the appended claims.

Having thus clearly shown and described the invention, what is claimed as new and desired to secure by Letters Patent, is:

1. In a gate valve structure a casing having a flowway therethrough and a chamber intersecting the flowway for the reception of a valve gate slidably mounted therein for sliding movement transversely of the flowway and including wedgingly engageable elements arranged for relative movement transversely of the flowway to expand the gate in a direction longitudinally of the flowway when the valve is closed, said casing having an internal annular recess opening into said chamber in surrounding relation to said flowway, and seat forming means having a circumferential interference fit with said recess disposed in said recess and extending into the chamber for sealing engagement with one of said elements, said means having at one end an annular end wall, a portion of which is positioned for abutting contact with the bottom of said recess adjacent said flowway, the remainder of said annular end wall spaced radially outwardly of the flowway and sloping away from said bottom and at the other end, an end surface shaped for engagement with said one of said gate elements in an annular zone remote from said flowway and to be out of contact with said one of said elements in an annular zone adjacent said flowway when said elements are out of wedging engagement, during wedging action the seat progressively engaging the gate elements.

2. In a gate valve structure a casing having a flowway therethrough and a chamber intersecting the flowway for the reception of a valve gate slidably mounted therein for sliding movement transversely of the flowway and including wedgingly engageable elements arranged for relative movement transversely of the flowway to expand the gate in a direction longitudinally of the flowway when the valve is closed, said casing having an internal annular recess opening into said chamber in surrounding relation to said flowway, and seat forming means having a circumferential interference fit with said recess disposed in said recess and extending into the chamber for sealing engagement with one of said elements, said means having an inner annular face forming a continuation of said flowway and an annular end face portion spaced radially outwardly of the flowway and longitudinally from the bottom of said recess, said means also having an end surface facing said one of said elements and shaped for engagement therewith in an annular zone remote from said flowway and to be out of contact with said one of said elements in an annular zone adjacent said flowway when said elements are out of wedging engagement, during wedging action the seat progressively engaging the gate elements.

3. In a gate valve structure a casing having a flowway therethrough and a chamber intersecting the flowway for the reception of a valve gate slidably mounted therein for sliding movement transversely of the flowway and including wedgingly engageable elements arranged for relative movement transversely of the flowway to expand the gate in a direction longitudinally of the flowway when the valve is closed, said casing having an internal annular recess of uniform depth opening into said chamber in surrounding relation to said flowway, and seat forming means disposed in said recess and extending into the chamber for sealing engagement with one of said elements, said means having an inner annular face forming a continuation of said flowway and an outer annular face which is shorter than said inner annular face in the direction of the axis of the flowway, said means also having an end surface positioned for engagement with said one of said elements and shaped to be in contact therewith in an annular zone remote from said flowway and to be out of contact therewith at the flowway when said elements are out of expanded condition, during expanded condition the seat being progressively engaged by the gate elements.

4. In a gate valve structure a casing having a flowway therethrough and a chamber intersecting the flowway for the reception of a valve gate slidably mounted therein for sliding movement transversely of the flowway and including wedgingly engageable elements arranged for relative movement transversely of the flowway to expand the gate in a direction longitudinally of the flowway when the valve is closed, said casing having an internal annular recess surrounding the flowway and opening into the chamber, and seat forming means disposed in said recess and extending into the chamber for sealing engagement with one of said elements, said means having at one end an annular face, a portion of which is positioned for abutting relation to the bottom of the recess adjacent said flowway and the remainder of said annular face located radially outwardly of the flowway positioned in spaced relation to said bottom, and at the other end an annular face positioned for sliding engagement with said one of said elements and shaped to be out of contact with said one of said elements adjacent the flowway when said elements are out of wedging engagement.

5. In a gate valve structure a casing having a flowway therethrough and a chamber intersecting the flowway for the reception of a valve gate slidably mounted therein for sliding movement transversely of the flowway and including wedgingly engageable elements arranged for relative movement transversely of the flowway to expand the gate in a direction longitudinally of the flowway when the valve is closed, said casing having an internal annular recess opening into said chamber in surrounding relation to said flowway, and whose bottom wall intersects the wall of the flowway in a plane substantially normal to the axis of the flowway, said bottom wall also having an annular portion spaced radially outwardly of the flowway and which slopes relative to said plane, and seat forming means having a circumferential interference fit with said recess disposed in said recess and extending into the chamber for sealing engagement with one of said elements, said means having at one end an annular end wall, a portion of which adjacent the flowway engages said bottom wall in said plane, and the remainder of said annular end wall spaced radially outwardly of the flowway and which slopes away from said sloping bottom wall portion and at the other end an annular face positioned for sliding engagement with said one of said elements and which is shaped for contact with said one of said elements in an annular zone remote from the flowway and to be out of contact with said one of said elements in an annular zone adjacent said flowway when said elements are out of wedging engagement, during wedging action the seat progressively engaging the gate elements.

6. In a gate valve structure a casing having a flowway therethrough and a chamber intersecting the flowway for the reception of a valve gate slidably mounted therein for sliding movement transversely of the flowway and including wedgingly engageable elements arranged for relative movement transversely of the flowway to expand the gate in a direction longitudinally of the flowway when the valve is closed, said casing having an internal annular recess opening into said chamber in surrounding relation to said flowway and formed with an inner annular bottom wall portion intersecting the flowway in a plane substantially normal to the axis of the flowway and an outer annular bottom wall portion which slopes relative to said plane, and seat forming means having a circumferential interference fit with said recess disposed in said recess and extending into the chamber for sealing engagement with one of said elements, said seal forming means having an annular inner end wall, a portion of which is positioned for abutting contact with said inner bottom wall portion of said recess adjacent said flowway and an outer annular end wall diverging from said outer bottom wall portion of said recess and an annular face positioned for sliding engagement with said one of said elements and which is shaped to be in contact therewith in an annular zone remote from said flowway and out of contact therewith in an annular zone adjacent said flowway when said elements are out of wedging engagement, during wedging action the seat progressively engaging the gate elements.

References Cited in the file of this patent

UNITED STATES PATENTS

| 197,994 | Burnett | Dec. 11, 1877 |
| 589,008 | Martin | Aug. 31, 1897 |
| 1,763,486 | Strong | June 10, 1930 |
| 2,148,628 | Laurent | Feb. 28, 1939 |
| 2,478,811 | Downs | Aug. 9, 1949 |
| 2,665,675 | Sheppard | Jan. 12, 1954 |

FOREIGN PATENTS

| 366,122 | Germany | Dec. 1922 |